United States Patent [19]
Choi

[11] Patent Number: 6,039,387
[45] Date of Patent: Mar. 21, 2000

[54] REINFORCEMENT DEVICE FOR SIDE DOORS OF AUTOMOBILES

[75] Inventor: Kuk-Sun Choi, Kyunggi-Do, Rep. of Korea

[73] Assignee: Hyundai Motor Company, Seoul, Rep. of Korea

[21] Appl. No.: 08/991,252

[22] Filed: Dec. 16, 1997

[30] Foreign Application Priority Data

Dec. 16, 1996 [KR] Rep. of Korea ............. 96-66440

[51] Int. Cl.[7] .................................................. B60J 5/04
[52] U.S. Cl. ..................... 296/188; 296/189; 296/146.6
[58] Field of Search ........................... 296/188, 146.6, 296/189; 49/502

[56] References Cited

U.S. PATENT DOCUMENTS

| | | | |
|---|---|---|---|
| 4,750,779 | 6/1988 | Van Rooij | 296/188 |
| 4,769,951 | 9/1988 | Kaaden | 49/502 |
| 4,831,710 | 5/1989 | Kahot et al. | 49/502 |
| 4,924,630 | 5/1990 | Lomasney et al. | 49/502 |
| 4,948,196 | 8/1990 | Baba et al. | 296/188 |
| 5,113,620 | 5/1992 | Guillaume et al. | 49/502 |
| 5,417,470 | 5/1995 | Holt | 296/188 |
| 5,470,125 | 11/1995 | Yamazaki | 296/146.6 |
| 5,581,947 | 12/1996 | Kowall et al. | 49/502 |
| 5,755,484 | 5/1998 | Choe et al. | 296/146.6 |

*Primary Examiner*—D. Glenn Dayoan
*Assistant Examiner*—Lori L. Coletta

[57] ABSTRACT

A reinforcement device for side doors of automobiles, including an impact bar mounted to an outer panel by two brackets at both ends, and an upper reinforcement member welded to the outer panel at a position above the impact bar, is disclosed. The reinforcement device further includes a plurality of first reinforcement members having a U-shaped strip configuration, and a second reinforcement member perpendicularly welded along the longitudinal center of the inner surface of each of the first members. In addition, the first members are vertically fitted into the lower portion of inner and outer panels at regularly spaced positions. An upper sub-reinforcement member extends from the top portion of each of the first member and welded to the upper reinforcement member.

3 Claims, 5 Drawing Sheets

REINFORCEMENT DEVICE FOR SIDE DOORS OF AUTOMOBILES

BACKGROUND OF THE INVENTION

1. Field of the Invention

The present invention relates, in general, to a reinforcement device for side doors and, more particularly, to a reinforcement device provided with reinforcement members arranged in the cavity between inner and outer panels so as to cover an impact bar, thereby more effectively absorbing the energy of an impact externally applied to the outer panel.

2. Description of the Prior Art

As well known to those skilled in the art, means for reducing the death and injury of passengers in traffic accidents has been actively studied recently. Front-end collisions of automobiles are generally considered most serious in traffic accidents, but automobile fatalities statistics according to side collisions show a yearly increase.

Thus, in order to reduce the death and injury of passengers in side collisions of automobiles, NHTSA (National Highway Traffic Safety Administration) in USA has enacted a reinforced law in relation to a safety standard for side collisions of automobiles. Such a safety standard is identical to the safety standard of automobiles in KOREA.

Therefore, in order to meet with the above safety standard for automobiles, an impact bar, a kind of reinforcement member, is mounted in the interior of the side door. Such an impact bar is a pipe made of a high strength steel. Preferably, the impact bar has a light weight, excellent productivity and high flexural rigidity.

In FIGS. 1 and 2, an example of such an impact bar is schematically illustrated. As shown in FIGS. 1 and 2, an impact bar 16, having a pipe-configuration, is mounted to an outer panel 12 in such a manner that both ends of the impact bar 16 are mounted to the inner surface of the outer panel 12 by two support brackets 14 and 15. In addition, an upper reinforcement member 13, having a flanges 13A, 13B at each side, is provided between inner and outer panels 11 and 12 in such a manner that both flanges of the upper reinforcement member 13 are welded to the outer panel 12 at a position above the impact bar 16. As a result, when any impact is externally applied to the outer panel 12, the upper torso and the pelvis of a passenger may be somewhat effectively protected from such an impact energy.

However, such a conventional impact bar has problems as will be described below. That is, the impact bar 16 fails to uniformly and effectively distribute the impact energy, externally applied to the outer panel, because both ends of the impact bar 16 are only supported by the brackets 14 and 15. Thus, even when a small impact is externally applied to the outer panel 12, the side door of the automobile is easily destroyed and forcibly pushed into a passenger compartment. As a result, a passenger may be easily injured. Therefore, the safety and reliability factors of the automobile are reduced.

SUMMARY OF THE INVENTION

Accordingly, the present invention has been made in view of the above problems occurring in the prior art, and an object of the present invention is to provide a reinforcement device for side doors, which uniformly and effectively distributes an impact energy externally applied to an impact bar, thereby reducing the injury of passengers.

In order to accomplish the above object, the present invention provides a reinforcement device for side doors of automobiles, each door having spaced inner and outer panels defining a cavity therebetween, the reinforcement device comprising an impact bar mounted to the outer panel by a bracket at both ends, and an upper reinforcement member mounted to a outer panel at a position above the impact bar, the improvement comprising: a plurality of first reinforcement members in said cavity having U-shaped strip configurations as viewed in side elevations between the inner and outer panels, said first members having upstanding legs of the U-shaped strip fitted between the inner and outer panels at regularly spaced positions and engaging the impact bar; a plurality of second reinforcement members perpendicularly secured along a longitudinal center line of inner surfaces of each of said first members; and upper sub-reinforcement members formed by bends in top portions of the legs of each of said first members contiguous to the outer panel and secured to said upper reinforcement member.

BRIEF DESCRIPTION OF THE DRAWINGS

The above object, and other features and advantages of the present invention will be more clearly understood from the following detailed description taken in conjunction with the accompanying drawings, in which.

DESCRIPTION OF THE PREFERRED EMBODIMENT

Figure 1:
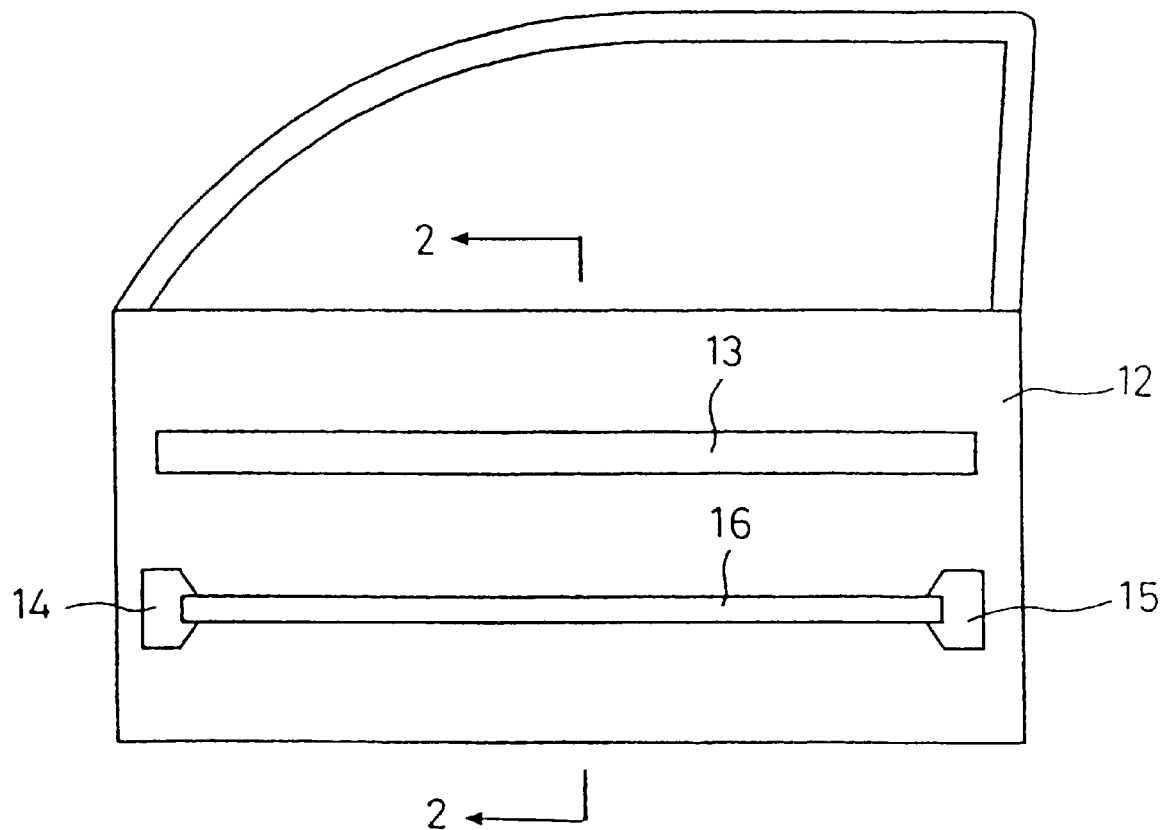
FIG. 1 is a schematically sectional view of a side door according to the prior art.
Figure 2:
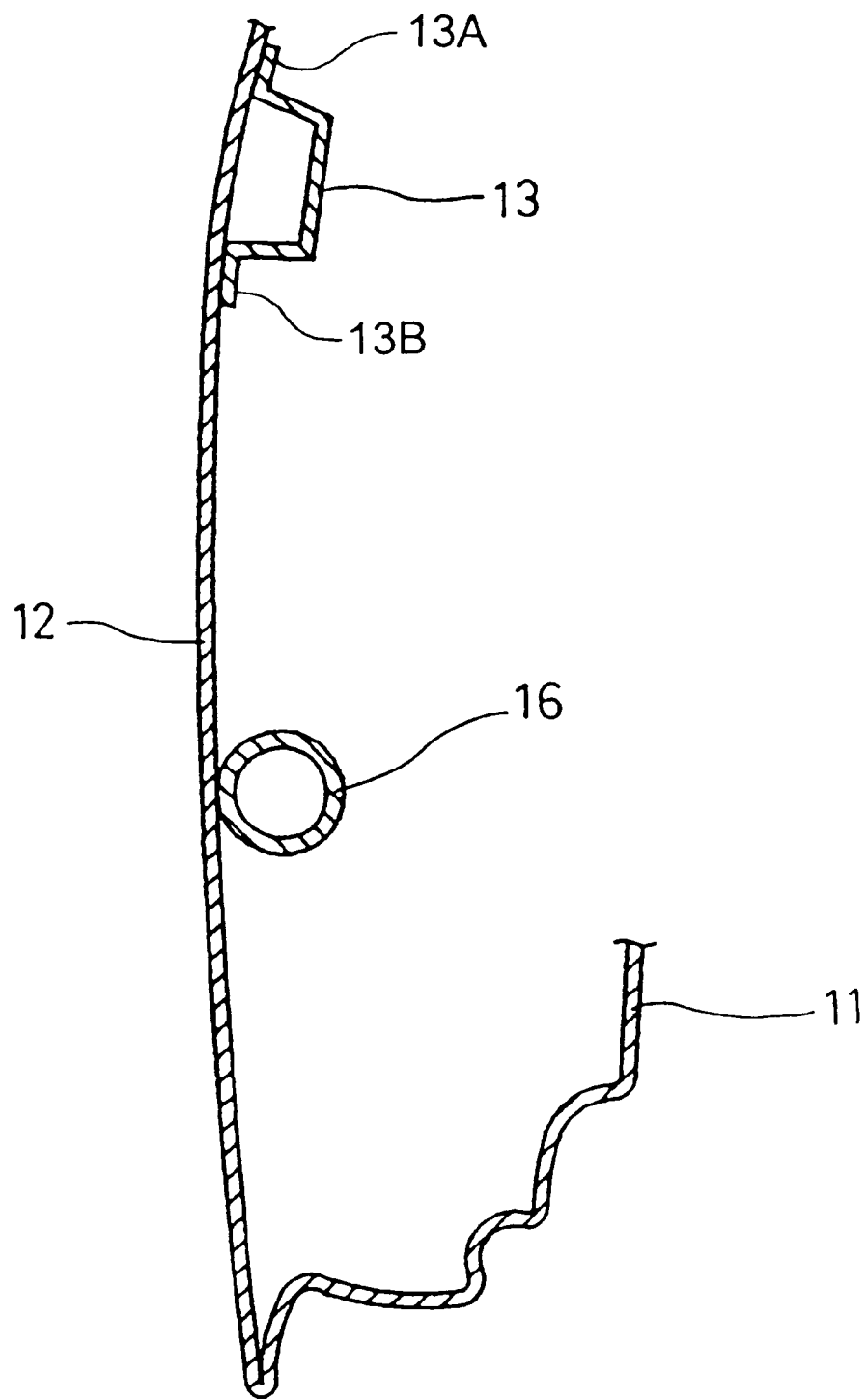
FIG. 2 is a sectional view of a side door taken along the line A—A of FIG. 1.
Figure 3:
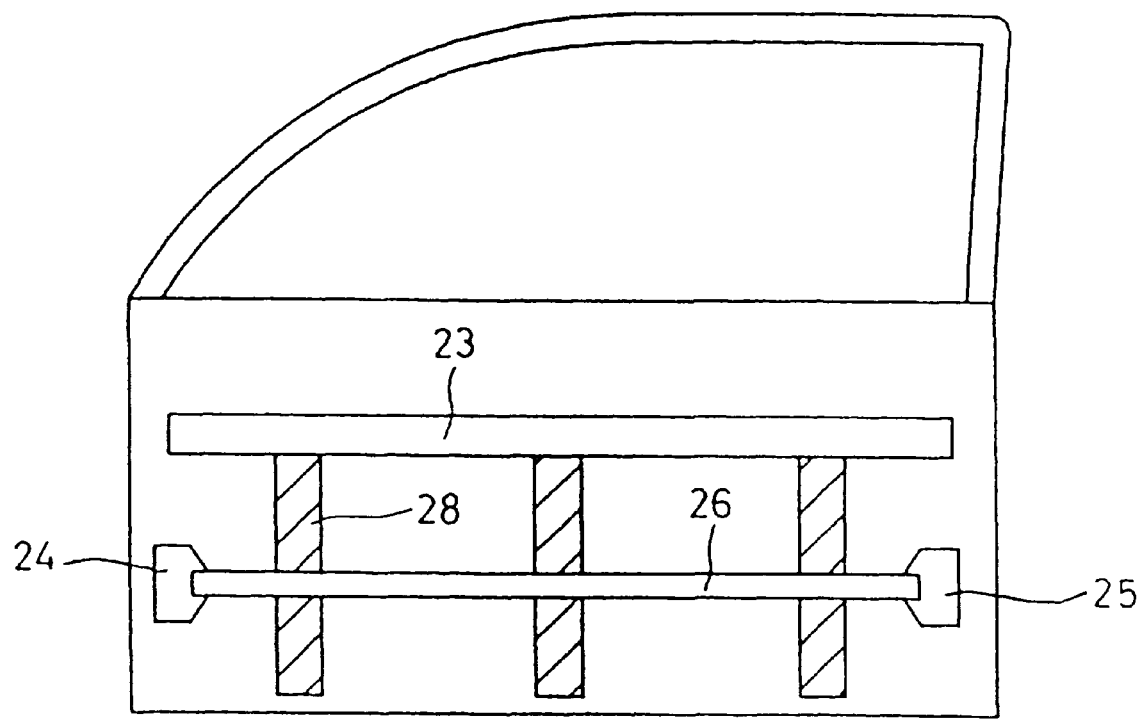
FIG. 3 is a schematically sectional view of a side door with a reinforcement device in accordance with a preferred embodiment of this invention.
Figure 4:
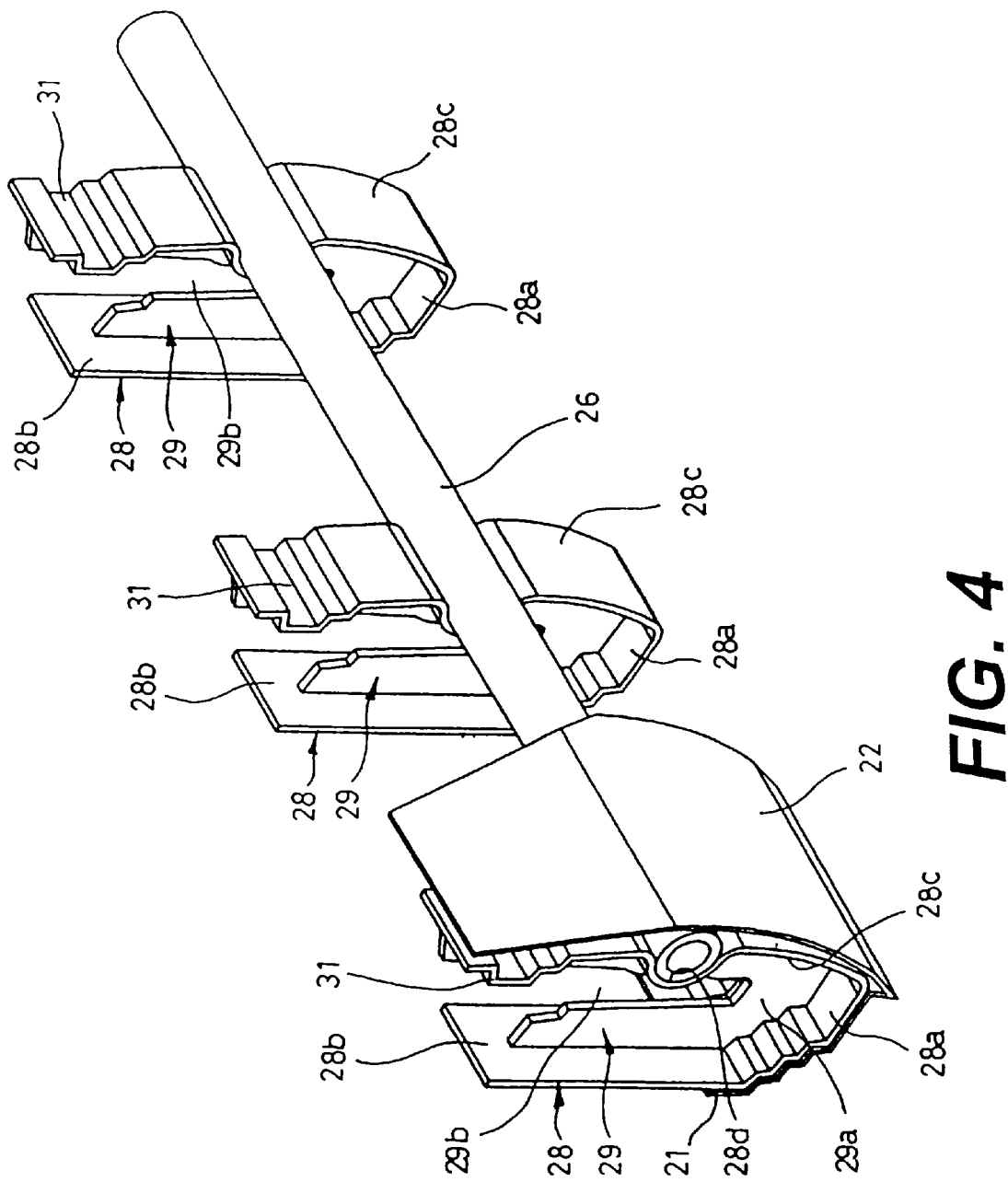
FIG. 4 is a perspective view of the reinforcement device in accordance with this invention.
Figure 5:
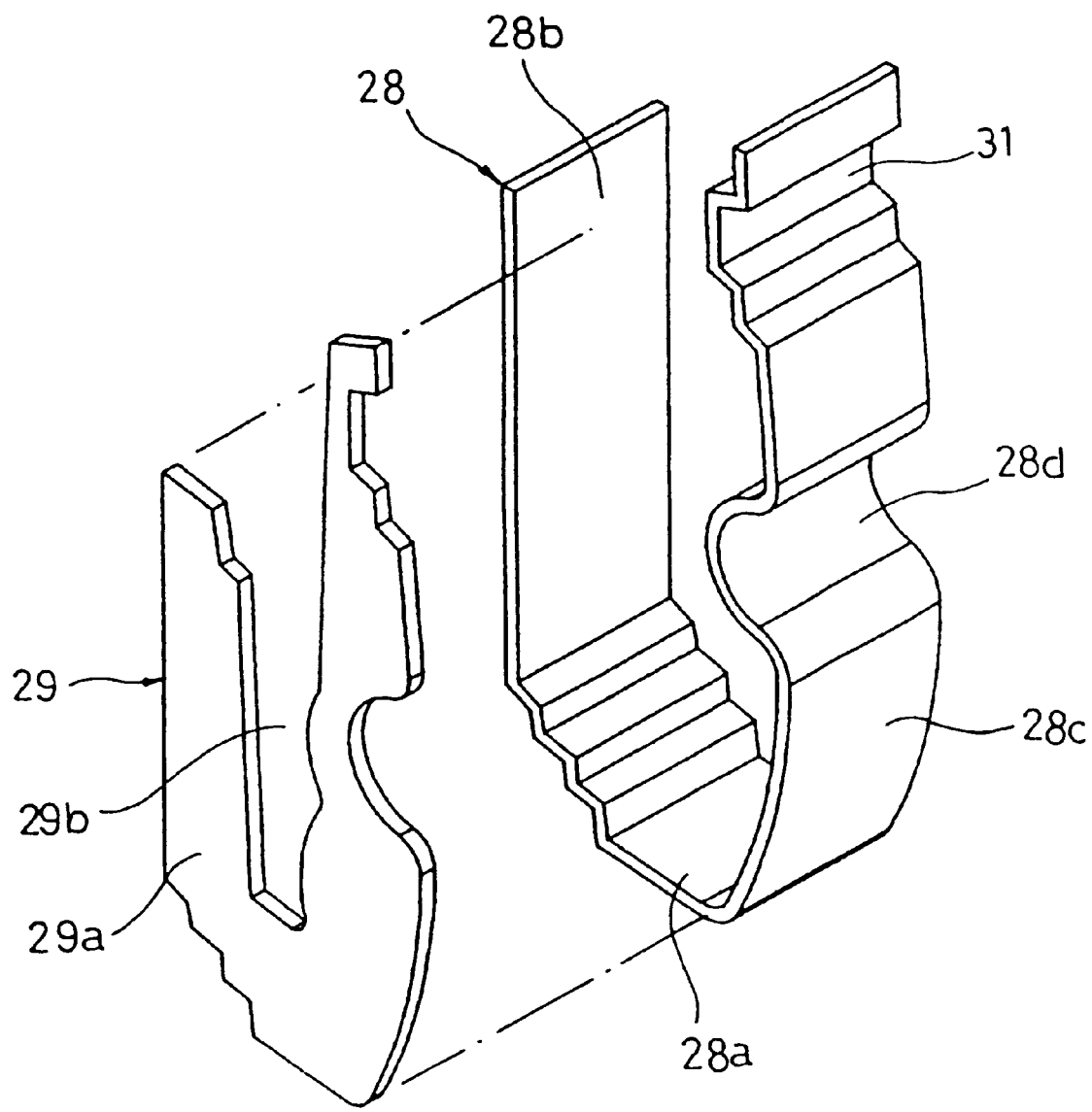
FIG. 5 is an exploded perspective view of the reinforcement device according to this invention.

FIGS. 3 to 5 schematically show the construction of a reinforcement device for side doors of automobiles according to the preferred embodiment of this invention.

As shown in FIGS. 3 to 5, an impact bar 26 is mounted to an outer panel 22 by two brackets 24 and 25 at both ends. Also, an upper reinforcement member 23, having a flange at each side, is welded to the outer panel 22 at its flanges at a position above the impact bar 26.

A plurality of first reinforcement members 28, having a U-shaped strip configuration, are vertically fitted into the lower portion of inner and outer panels 21 and 22 at regularly spaced positions. As a result, the impact bar 26 engages and is partially covered by the first reinforcement members 28.

In addition, a plurality of second reinforcement members 29 are perpendicularly welded along the longitudinal center line of the inner surface of the first members 28, respectively. A plurality of upper sub-reinforcement bends 31, are formed in the legs of the U-shaped strip for conformably engaging the upper reinforcement bar 23. These bends are pre-welded to the upper reinforcement member 23.

The first reinforcement members 28 comprise bottom, inside upright, outside and recess parts 28a, 28b, 28c and 28d. That is, the bottom part 28a has a specific shape so as to interiorly face the specifically-designed bottom portion of the inner panel 21. The inside upright part 28b integrally and vertically extends from the inside end of the bottom part 28a and is interiorly supported on the inner panel 21. The outside part 28c integrally and upwardly extends from the outside end of the bottom part 28a and is interiorly supported on the lower portion of the outer panel 22. The recess part 28d is formed on the outside part 28c at a position corresponding to the impact bar 26 and is adapted for covering the impact bar 26.

The second reinforcement members 29 comprise an integrated body 29a having a specifically designed outline substantially meeting with the inner surface of each of the first reinforcement members 28. Also, the body 29a is vertically cut from the top to a predetermined depth, thus forming a longitudinal cutout 29b. As a result, when any impact is externally applied to the, outer panel 22, the body 29a is selectively and plastically deformed, thereby more effectively absorbing the impact energy.

The function of the reinforcement device according to the preferred embodiment of this invention is described below.

When any impact is externally applied to the outer panel 22, an impact energy is primarily transmitted to both the upper reinforcement member 23 and the impact bar 26 at the same time. Thereafter, the impact energy, transmitted to the impact bar 26, is distributed to the two brackets 24 and 25, and a plurality of first and second reinforcement members 28 and 29. In such a case, due to the longitudinal cutout 29b of the second member 29, the integrated body 29a is selectively and plastically deformed by means of the impact energy. Thus, the impact energy is rapidly reduced prior to being transmitted to the inner panel 21.

In addition, the impact energy, transmitted to the upper reinforcement member 23, is uniformly distributed to the upper sub-reinforcement members 31 and throughout the side door at the same time. In such a case, even when a small impact is externally and locally applied to the outer panel 22, the impact energy is uniformly and widely distributed to the side door, thus effectively reducing the side impact energy.

As mentioned above, the reinforcement device for side doors of automobiles in accordance with the present invention has a specifically designed configuration in which a plurality of first and second reinforcement members are mounted in the cavity between inner and outer panels, thereby effectively absorbing an impact energy externally applied to the outer panel. Therefore, the destruction of the side door is greatly reduced when any impact is externally applied to the side door. As a result, the injury of a passenger is reduced. In addition, the safety and reliability factors of the automobile are increased.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A reinforcement device for side doors of automobiles, each door having spaced inner and outer panels defining a cavity therebetween, the reinforcement device comprising an impact bar mounted to the outer panel, and an upper reinforcement member mounted to said outer panel at a position above the impact bar, the improvement comprising:

a plurality of U-shaped first reinforcement members in said cavity between the inner and outer panels;

said first members fitted between the inner and outer panels at regularly spaced positions and the recess part of said first members engages the impact bar;

a plurality of second reinforcement members secured along a longitudinal center line of inner surfaces of each of the first members; and upper sub-reinforcement members formed by bends in top portions of said first members contiguous to the outer panel and secured to said upper reinforcement member.

2. The reinforcement device as claimed in claim 1, wherein each of said first reinforcement members comprises:

a bottom portion support on the interior of the bottom portion of the said inner panel.

3. The reinforcement device as claimed in claim 1, wherein said second reinforcement member comprises:

an integrated body having a specifically designed outline substantially conforming to inner surfaces of each of said first reinforcement members, said body having a cutout extending from the top thereof to a predetermined depth, thus forming a longitudinal cutout allowing the body to be selectively and plastically deformed when impact energy is externally applied to the outer panel, thus absorbing the impact energy.

* * * * *